(12) United States Patent
Cois et al.

(10) Patent No.: US 12,423,147 B2
(45) Date of Patent: Sep. 23, 2025

(54) SYSTEM FOR TRANSPARENT PROVISIONING OF FUNCTIONALLY IDENTICAL RESOURCES ACROSS DIVERSE HOSTING AND CLOUD PLATFORMS

(71) Applicant: Verint Americas Inc., Alpharetta, GA (US)

(72) Inventors: Constantine Cois, Fayetteville, PA (US); Henry Zektser, Marble Falls, TX (US)

(73) Assignee: Verint Americas Inc., Alpharetta, GA (US)

( * ) Notice: Subject to any disclaimer, the term of this patent is extended or adjusted under 35 U.S.C. 154(b) by 471 days.

(21) Appl. No.: 18/095,201

(22) Filed: Jan. 10, 2023

(65) Prior Publication Data
US 2024/0231918 A1    Jul. 11, 2024

(51) Int. Cl.
*G06F 9/50* (2006.01)
(52) U.S. Cl.
CPC .......... *G06F 9/5027* (2013.01); *G06F 9/5072* (2013.01)
(58) Field of Classification Search
CPC ................................................... G06F 9/5027
See application file for complete search history.

(56) References Cited

U.S. PATENT DOCUMENTS 8,793,684 B2 *  7/2014  Breitgand ........... G06F 9/45558
                                                      718/1
2019/0303297 A1 * 10/2019  Fleming, Jr. ........ G06F 13/1668

OTHER PUBLICATIONS

Terraform—Provision & Manage any Infrastructure, HashiCorp URL: https://www.hashicorp.com/products/terraform?ajs_aid=62656056-7e53-47c0-aadf-0b4616d3d814&product_intent=terraform, Jan. 2023.
The cloud native control plane framework., Crossplane URL: https://www.crossplane.io/, Jan. 2023.

* cited by examiner

*Primary Examiner* — Charlie Sun
(74) *Attorney, Agent, or Firm* — Dinsmore & Shohl LLP

(57) ABSTRACT

A method for deployment of cloud resources in one or more cloud environments includes receiving a request, through a user interface, to deploy a cloud resource, the request comprising an abstract resource definition and one or more target deployment locations; identifying and executing a first resource manager associated with a first target deployment location of the one or more target deployment locations; generating, with the first resource manager based on the abstract resource definition, a first manifest for deployment of the cloud resource at the first target deployment location; deploying, with the first resource manager, an instance of the cloud resource on a first cloud-computing infrastructure defined by the first target deployment location, wherein the instance is based on the first manifest; and returning, through the user interface, information corresponding to the instance of the cloud resource deployed on the first cloud-computing infrastructure.

20 Claims, 6 Drawing Sheets

SYSTEM FOR TRANSPARENT PROVISIONING OF FUNCTIONALLY IDENTICAL RESOURCES ACROSS DIVERSE HOSTING AND CLOUD PLATFORMS

INTRODUCTION

Technical Field

The present specification relates to systems and methods for deploying cloud resources in one or more cloud environments.

BACKGROUND

Cloud provisioning generally refers to the processes for the deployment and integration of cloud-computing resources within a cloud environment, such as an enterprise's information technology (IT) infrastructure. Provisioning and configuring a cloud system and associated cloud resources with identical functional configurations across multiple heterogeneous cloud environments conventionally requires a developer to obtain credentials for each cloud environment and write a script specific to each type of cloud environment for deployment. While the term script may connote only a few commands for execution by a program, scripts also refer to infrastructure deployment code that can include enormous amounts of code. That is, the script must generally account for disparate underlying resources and configurations within each cloud environment including, for example, network rules, network resources, routes, security, credentials, abstractions for storage, compute abstractions (e.g., CPU and memory capacity to run an arbitrary piece of code), and the like. The distinct scripts are then used to create an instance of the cloud resources on each of the respective cloud environments. Maintaining each of the instances of the cloud resources across the heterogeneous cloud environments requires perpetual, environment-specific updates to the various scripts and individual sets of software code. Thus, the conventional process of deployment and maintenance involves significant overhead for software developers while also creating significant technical issues when creating and maintaining infrastructure across multiple cloud environments. For example, the aforementioned software developers need to have a deep understanding of the nuances of each cloud environment to conventionally deploy and maintain cloud systems.

Accordingly, a need exists to improve systems and methods for deploying cloud resources across heterogeneous cloud environments.

SUMMARY

In a first embodiment, a method for deployment of cloud resources in one or more cloud environments includes receiving a request, through a user interface, to deploy a cloud resource, the request comprising an abstract resource definition and one or more target deployment locations; identifying and executing a first resource manager associated with a first target deployment location of the one or more target deployment locations; generating, with the first resource manager based on the abstract resource definition, a first manifest for deployment of the cloud resource at the first target deployment location; deploying, with the first resource manager, an instance of the cloud resource on a first cloud-computing infrastructure defined by the first target deployment location, wherein the instance is based on the first manifest; and returning, through the user interface, information corresponding to the instance of the cloud resource deployed on the first cloud-computing infrastructure.

In another embodiment, a system for deployment of cloud resources in one or more cloud environments includes a computing device communicatively coupled to a cloud-computing network, the computing device configured to: receive a request, with the computing device, to deploy a cloud resource, the request comprising an abstract resource definition and one or more target deployment locations; identify and execute a first resource manager associated with a first target deployment location of the one or more target deployment locations; generate, with the first resource manager based on the abstract resource definition, a first manifest for deployment of the cloud resource at the first target deployment location; deploy, with the first resource manager, an instance of the cloud resource on a first cloud-computing infrastructure defined by the first target deployment location, wherein the instance is based on the first manifest; and return, through a user interface of the computing device, information corresponding to the instance of the cloud resource deployed on the first cloud-computing infrastructure.

In another embodiment, a computer program product for deployment of cloud resources in one or more cloud environments, the computer program product includes instructions, which when executed by a computer, cause the computer to carry out steps including: receiving a request, through a user interface, to deploy a cloud resource, the request comprising an abstract resource definition and one or more target deployment locations; identifying and executing a first resource manager associated with a first target deployment location of the one or more target deployment locations; generating, with the first resource manager based on the abstract resource definition, a first manifest for deployment of the cloud resource at the first target deployment location; deploying, with the first resource manager, an instance of the cloud resource on a first cloud-computing infrastructure defined by the first target deployment location, wherein the instance is based on the first manifest; and returning, through the user interface, information corresponding to the instance of the cloud resource deployed on the first cloud-computing infrastructure.

These and additional features provided by the embodiments described herein will be more fully understood in view of the following detailed description, in conjunction with the drawings.

DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

Figure 1:
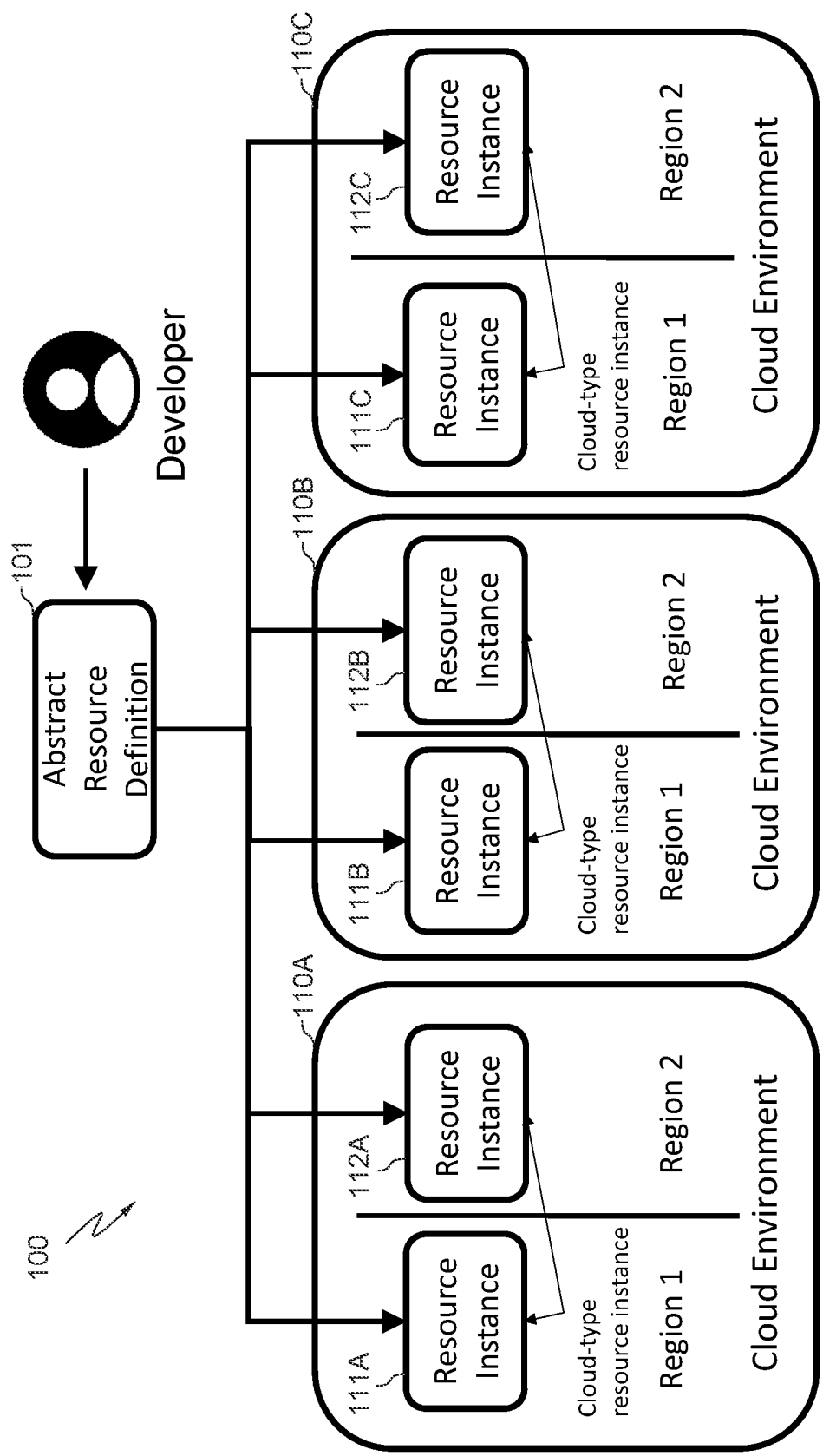
FIG. 1 depicts an illustrative block-diagram of a cloud-computing network having different cloud environments, according to one or more embodiments shown and described herein.

Embodiments of the present disclosure are directed to systems and methods for deploying cloud-computing (generally, "cloud") resources across heterogeneous cloud environments using abstract resource definitions that are cloud environment-agnostic.

Generally, cloud resources include cloud-based services, microservices, applications, network configurations, security configurations, data repositories, databases, and the like that are implemented in cloud environments. Note that while various examples described herein refer to cloud resources being deployed to cloud environments, the systems and methods described herein are equally applicable and useful to other types of environments, such as networked computing environments, server environments, and the like, in which such resources may be referred to as networked computing resources, server computing resources, and the like. The various examples are further applicable and useful for deploying of configurations within applications.

Currently, software developers provision and configure instances of cloud resources having identical functional configurations across multiple heterogeneous cloud environments by obtaining credentials to each cloud environment and writing cloud environment-specific scripts that configure the cloud resources for each specific cloud environment, including for example, based on specific network rules, routes, security, credentials, and the like for each specific cloud environment. Each of the cloud environment-specific scripts are then used to create an instance of the cloud resource within each of the respective cloud environments. Thus, the conventional processes for deploying and maintaining instances of a cloud resource across multiple different cloud environments that utilize different coding syntax and resource definitions require that a developer understand the underlying elements of each cloud environment and create distinct sets of code to enable deployment of each instance of the cloud resource or create distinct architectures that are functionally equivalent. However, as the need to deploy cloud resources, such as MySQL® databases, across different cloud environments continues to be desired and as the number of different cloud environments grows, there is a need to simplify and automate the process of deploying and maintaining cloud resources with identical functional configurations across multiple heterogeneous cloud environments.

Moreover, conventional methods exhibit certain technical problems and compromises. For example, because it is conventionally difficult to deploy and maintain cloud resources across heterogeneous cloud environments, those resources may be updated and otherwise maintained less frequently, if at all, after deployment. This leads to resource performance degradation, security vulnerabilities, and incompatibilities between cloud environments.

The systems and methods described herein minimizes the overhead for developers when deploying cloud resources across multiple heterogeneous cloud environments by providing a technical solution to ensure automated deployment and maintenance of cloud resources replicated across multiple cloud environments, even when the underlying cloud environments differ in implementation details and technologies. As described in more detail herein, systems and methods enable a developer to create a single abstract resource definition using cloud environment-agnostic syntax and designate target deployment locations that are then automatically translated into manifests and deployed on cloud environments designated at the target deployment locations. The manifests are cloud environment specific file that has a syntax and parameter definitions that correspond to those required for deployment of cloud resources on the respective cloud environment.

Accordingly, a developer does not need to utilize multiple different syntaxes (e.g., different coding languages) and resource calls that are unique to the different cloud environments to enable deployment of functionally equivalent instances of a cloud resource across heterogeneous cloud environments. Consequently, the systems and methods described herein solve the technical problems in conventional systems and methods and improve the ability to deploy and maintain cloud resources across heterogeneous cloud environments. For example, such deployments may be deployed, updated, and maintained more frequently and consistently, which in-turn leads to maintaining resource performance, improved security, and improved compatibility between environments.

In some embodiments, the systems and methods described herein utilize state system application programming interfaces (APIs) that are configured to monitor each manifest defining an instance of a cloud resource and the actual state of the cloud resource in the cloud environment. As described in more detail herein, the state system APIs determine when differences between the instance of the cloud resource deployed in a first cloud-computing environment and the manifest arise and, in response, initiate a reconciliation process without the developer needing to continually monitor and perform maintenance on each instance of the cloud resource across the heterogeneous cloud environments. Additionally, the state system APIs can ensure drift does not occur across the cloud environments. Furthermore, an update to one instance of a cloud resource at a first location in a first cloud environment can be automatically rolled out to other deployed instances of the cloud resource without requiring a developer to interact directly with each of the other instances of the cloud resource.

Example Cloud-Computing Network with Different Cloud Environments

FIG. 1 depicts an illustrative block-diagram of a cloud-computing network having different cloud environments, including in this example cloud environments 110A, 110B, and 110C. For example, cloud environments 110A, 110B, and 110C may be examples of commercially available cloud environments, such as Microsoft Azure® (Azure®), Amazon Web Services® (AWS®), and Google Cloud Platform™ (GCP™), to name a few examples.

The cloud environments 110A, 110B, and 110C include a plurality of regions. Regions are the geographical areas where data centers for cloud service providers are located. In embodiments, a developer generates a request to deploy a cloud resource. The request includes an abstract resource definition 101 and one or more target deployment locations (e.g., regions 1 and 2 of cloud environment 110A, regions 1 and 2 of cloud environment 110B, and regions 1 and 2 of cloud environment 110C).

As used herein, abstract resource definition 101 generally refers to a specification that defines the configuration of the cloud resource. The abstract resource definition 101 may be a written specification (e.g., a machine-readable format) generated by a developer. For example, an abstract resource definition 101 may recite the following specification "a MySQL® database, 4 CPUs, 8 GB of RAM, and 512 GB of disk" and the target deployment locations may be all regions available on AWS®, Azure®, and GCP™. In some embodiments, the abstract resource definition 101 is defined using a particular cloud environment's syntax, while in other embodiments the abstract resource definition is defined in a cloud-agnostic form. Regardless of the syntax employed to define the abstract resource definition 101, the systems and methods described herein translate the abstract resource definition 101 into respective manifests that correspond to each of the cloud environments 110A, 110B, and 110C that the defined cloud resource is intended to be deployed based on the one or more target deployment locations specified by the request.

More generally, the systems and methods of the present disclosure enables a developer to create a single abstract resource definition 101 that is translated, by the resource managers (e.g., 205 of FIGS. 2-3) into manifests specific to each of the one or more target deployment locations (e.g., regions 1 and 2 of cloud environment 110A, regions 1 and 2 of cloud environment 110B, and regions 1 and 2 of cloud environment 110C). The systems and methods then use the manifests to deploy instances of the cloud resource (e.g., instances 111A, 112A, 111B, 112B, 111C, and 112C) on the cloud-computing infrastructures (e.g., regions of the cloud environments) defined by the one or more target deployment locations.

The manifest specifies the desired state of a cloud resource that the resource manager and state system will maintain when the manifest is deployed to a deployment location on the cloud environment. The resource manager and the state system will be described in more detail herein below with reference to FIGS. 2-4.

Figure 2:
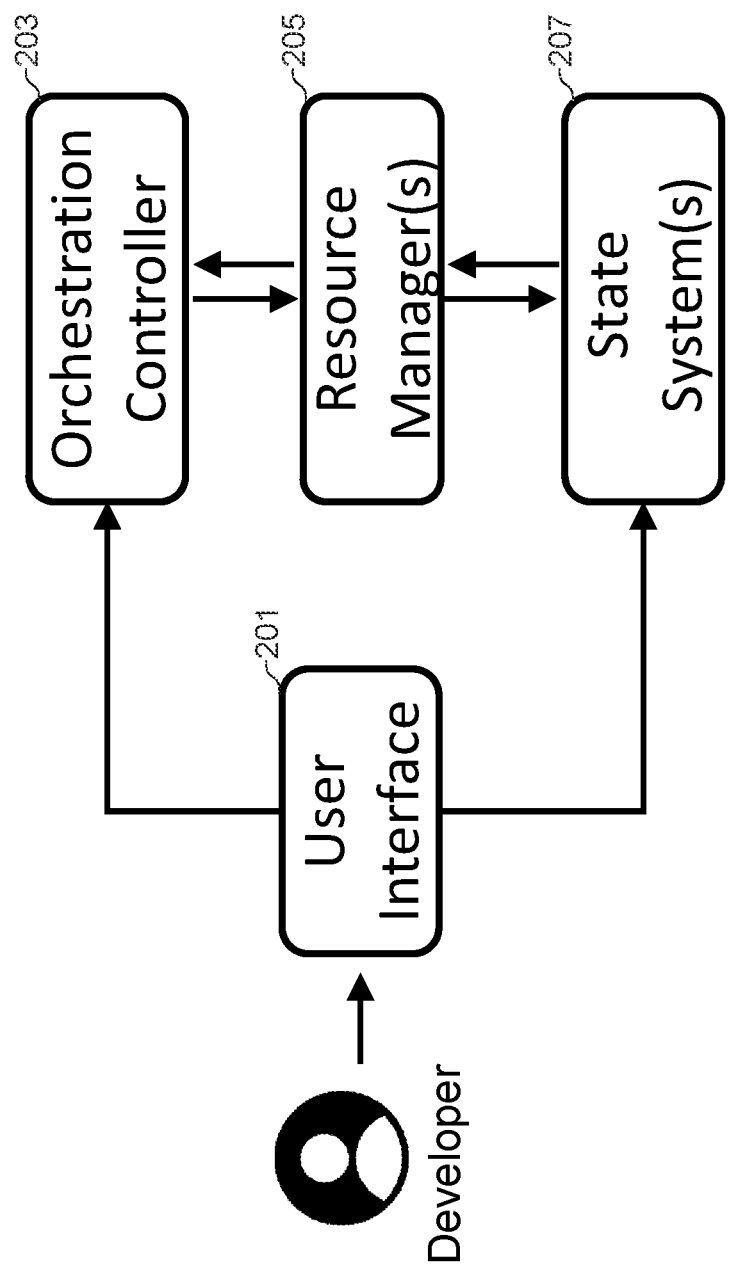
FIG. 2 depicts an illustrative block-diagram of the components for deploying cloud resources, according to one or more embodiments shown and described herein.

Example Block-Diagram of Component for Deploying Cloud Resources to Different Cloud Environments FIG. 2 depicts an illustrative block-diagram of the components for deploying cloud resources to different cloud environments. The components depicted in FIG. 2 may be implemented using a processing system (e.g., 600 of FIG. 6) and/or a cloud service (e.g., on AWS®, Azure®, and GCP™) which will be described in more detail herein below. The components depicted in FIG. 2 include a user interface 201, an orchestration controller 203, a resource manager 205, and a state system 207. In embodiments, the orchestration controller 203, the resource manager 205, the state system 207 can be implemented as APIs on a processing system (e.g., 600 of FIG. 6), or another element of the cloud-computing network 100 (FIGS. 1 and 5).

Figure 5:
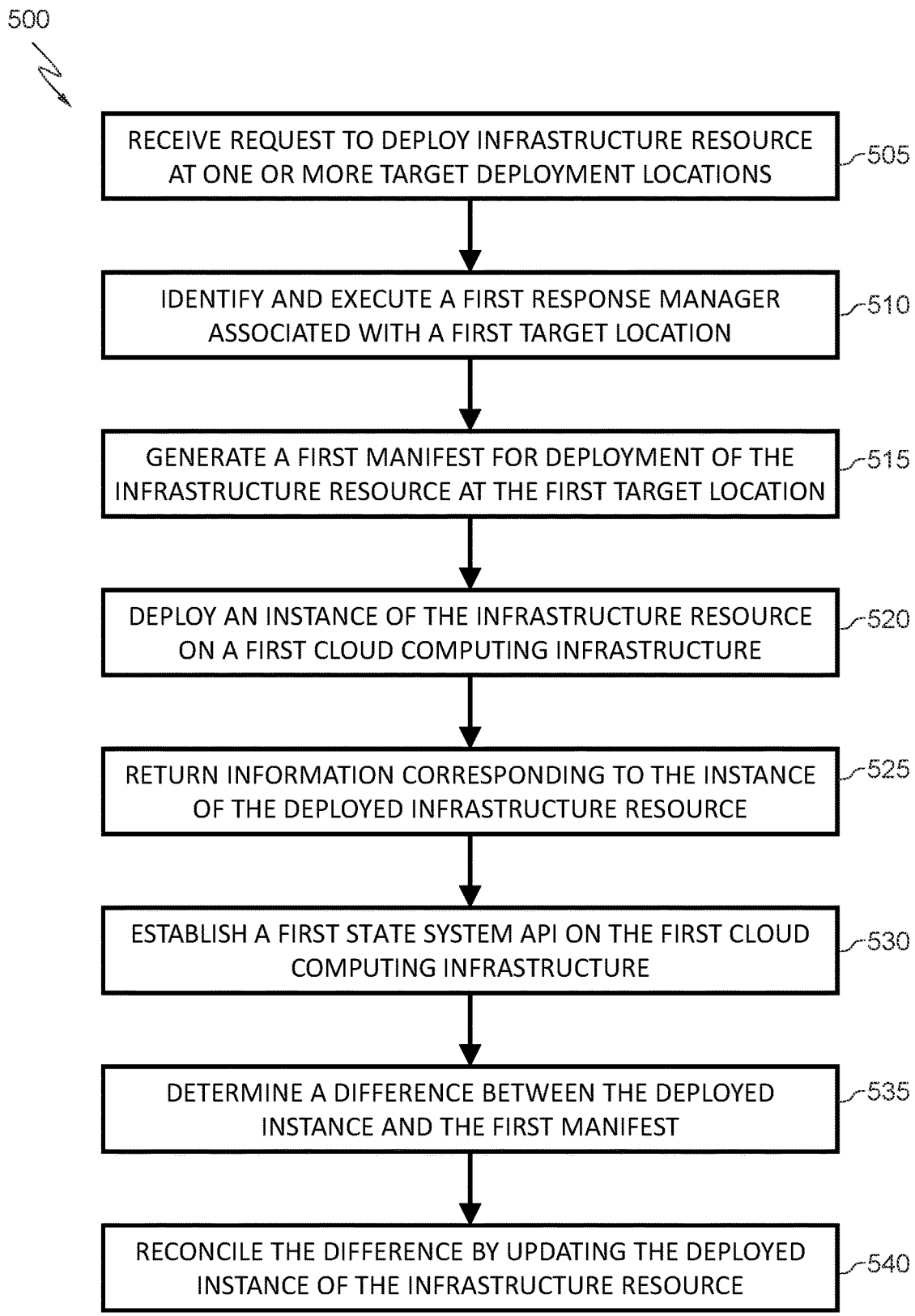
FIG. 5 depicts a flowchart for an example method for deploying cloud resources in one or more cloud environments, according to one or more embodiments shown and described herein.

The user interface 201 is configured to enable a developer to interface with the orchestration controller 203, the resource manager 205, the state system 207, and the cloud-computing network 100 (e.g., in FIGS. 1 and 5). As depicted in FIG. 2, each of the orchestration controller 203, the resource manager 205, and the state system 207 are communicatively coupled.

Generally, the orchestration controller 203 manages distribution of resources to the appropriate resource manager(s) 205 across the different cloud environments. In embodiments, the orchestration controller 203 is configured to identify the appropriate resource manager 205 for translating the abstract resource definition 101 into a manifest that is compatible with a cloud environment. In some embodiments, each resource manager 205 is categorized by an input file type, which it is configured to receive, and a target cloud environment type in which it is able to generate the requested resource. For example, one resource manager may be categorized as an abstract resource definition 101 to GCP™ type cloud environments. Accordingly, the process of identifying the appropriate resource manager 205 for translating the abstract resource definition 101 into a manifest that is compatible with a cloud environment is accomplished by selecting the resource manager that receives an input file type that corresponds to the file type of the abstract resource definition and generates, and records if necessary, the commands and inputs required by the target could environment in order to create the requested resource that corresponds to the target deployment location.

The resource manager 205 manages creation of instances of the cloud resource in the various clouds environments. Embodiments include multiple resource managers 205, including custom resource managers that are configured to parse and translate the abstract resource definition 101 into a manifest defining at least one of a set of network rules and application programming interface calls for deploying the instance of the cloud resource on cloud environments (e.g., 110A, 110B, and 110C of FIG. 1). To perform the parsing and translation of the abstract resource definition 101 into a manifest for deploying the instance of the cloud resource on cloud environments, a resource manager 205 may implement one or more natural language processing techniques, such as named entity recognition, word sense disambiguation, or the like to parse the abstract resource definition 101 into identifiable and/or meaningful segments. Additionally, for example, the resource manager 205 may include classification logic, which classifies parsed portions of the abstract resource definition 101 into categories such as hardware or virtual machine resources, network rules, routes, security, and other parameters required for deploying an instance of a cloud resource in a specific cloud-computing environment. For example, an abstract resource definition 101 reciting "MySQL®, 4 CPUs, 8 GB of RAM, and 512 GB of disk in AWS®" may be processed by a resource manager 205 that receives an input file type of, for example, natural language text and generates an output file type that is comprehendible by an AWS® cloud-computing environment. The resource manager 205 would identify "MySQL®" as the database type, "4 CPUs, 8 GB of RAM, and 512 GB of disk" as hardware or virtual machine resource allocations, and "AWS®" as the target deployment location, for example, by using natural language processing and/or classification logic.

Additionally, the resource managers 205 are configured to deploy an instance of the cloud resource within a cloud-computing environment defined by the target deployment location using the manifest generated from the abstract resource definition 101.

The state system 207 is generally a component for deploying cloud resources that is configured to track the state of each manifest defining a cloud resources and the actual state of the instance of the cloud resource in the cloud-computing environment. In some embodiments, one or more state systems 207 may be deployed as APIs to monitor the instance of the cloud resource deployed to the cloud-computing environment and the manifest. The one or more state systems 207 may be further configured to determine the presence of differences between the instance of the cloud resource deployed on the cloud-computing infrastructure and the manifest, and in response to determining a difference, reconcile the difference by updating the instance of the cloud resource deployed on the cloud-computing infrastructure.

In some embodiments, differences between the instance of the cloud resource deployed on the cloud-computing infrastructure and the manifest may be determined by querying the current configuration state of the cloud resource. The state system 207 can be configured to execute the aforementioned call and receive in response a configuration file, a configuration record, or configuration data corresponding to the current configuration state of the cloud resource. Next, the specification defined by the received configuration file and the manifest can be compared to determine whether there are any difference and further make a determination as to whether any of the differences need to be reconciled or updated.

Figure 3:
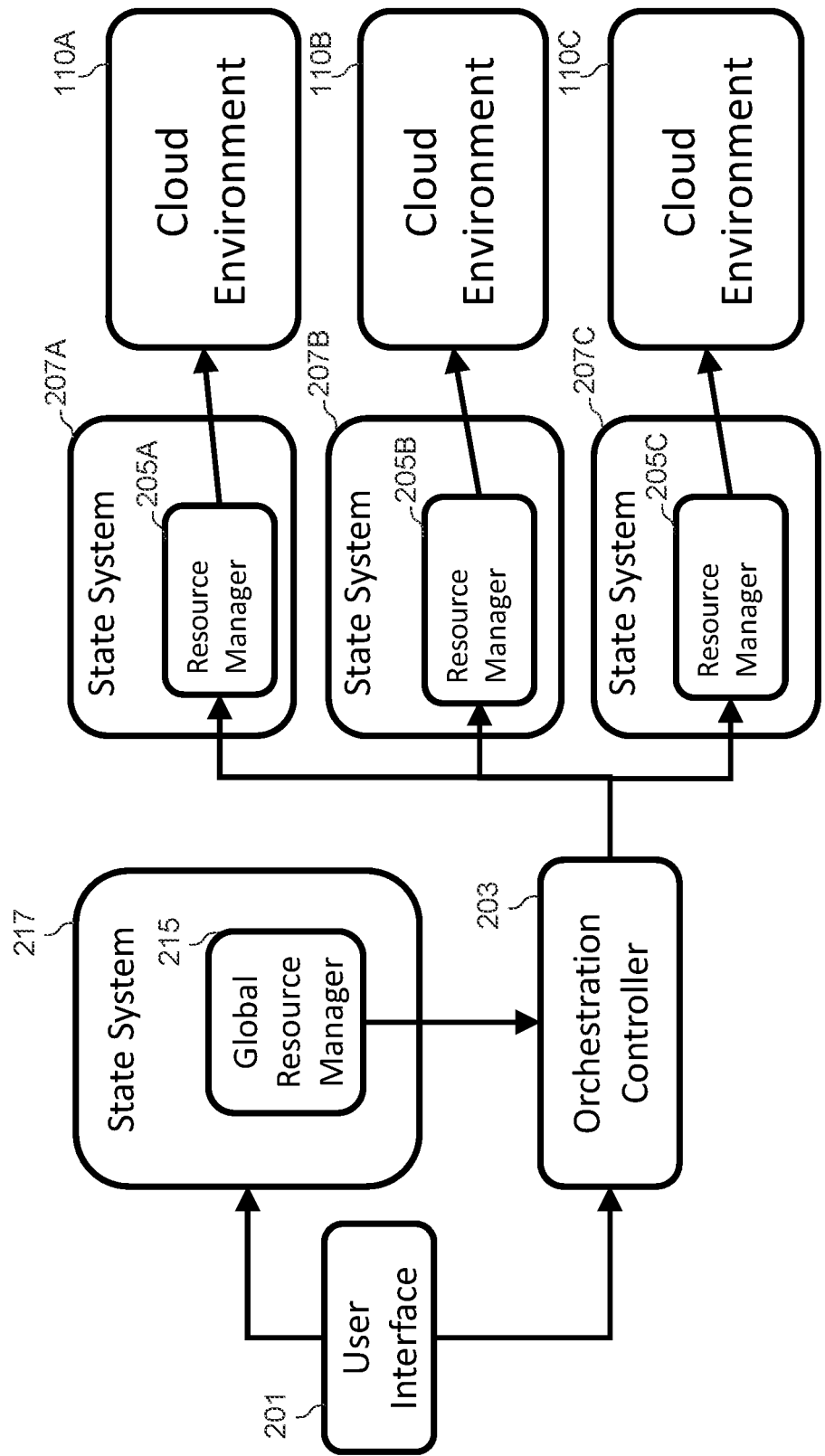
FIG. 3 depicts an illustrative block-diagram of a system for deploying cloud resources implemented with different cloud environments, according to one or more embodiments shown and described herein.

Referring now to FIG. 3, a more detailed illustrative block-diagram of the components for deploying cloud resources is depicted. In particular, FIG. 3 illustratively depicts implementation of the components initially described with reference to FIG. 2 in a cloud-computing network 100 having three different cloud environments 110A, 110B, and 110C where instances of cloud resources are deployed. As previously described, a user interface 201 (e.g., a processing system (e.g., 600 of FIG. 6) and/or a cloud service (e.g., on AWS®, Azure®, and GCP™)), enables a developer to interface with the system for deployment of cloud resources in the cloud environments 110A, 110B, and 110C.

In the embodiment depicted in FIG. 3, a request to deploy a cloud resource is received by the orchestration controller 203 and the state system 217. The request includes an abstract resource definition 101 and three target deployment locations: a first cloud environment 110A, a second cloud environment 110B, and a third cloud environment 110C. The state system 217 and global resource manager 215 operate as master nodes that control and manage custom state systems (e.g., state system 207A, state system 207B, and state system 207C) and custom resource managers (e.g., resource manager 205A, resource manager 205B, and resource manager 205C), each of which are customized to interface with corresponding cloud environments. The state system 217 and global resource manager 215 control and manage the custom systems and custom resources via the orchestration controller 203.

Additionally, the orchestration controller 203 identifies the necessary state systems 207A, 207B, and 207C and the necessary resource managers 205A, 205B, and 205C based on the target deployment locations, for example, the first cloud environment 110A, the second cloud environment 110B, and the third cloud environment 110C. Once the resource managers 205A, 205B, and 205C are identified, the orchestration controller 203 distributes the abstract resource definition 101 to the resource managers 205A, 205B, and 205C. The resource managers 205A, 205B, and 205C parse and translate the abstract resource definition 101 into manifests. The manifest is a cloud environment-specific file that has a syntax and parameter definitions that correspond to those required for deployment of cloud resources on the respective cloud environment.

After instances of the cloud resource defined by the abstract resource definition 101 is deployed on the respective cloud environments 110A, 110B, and 110C, the respective state systems (e.g., state system 207A, state system 207B, and state system 207C), continually monitor the instances of the cloud resource deployed on the respective cloud environments cloud-computing infrastructure and the respective manifests. If differences are detected by the respective state systems (e.g., state system 207A, state system 207B, and state system 207C), an update or reconciliation process can be executed.

Figure 4:
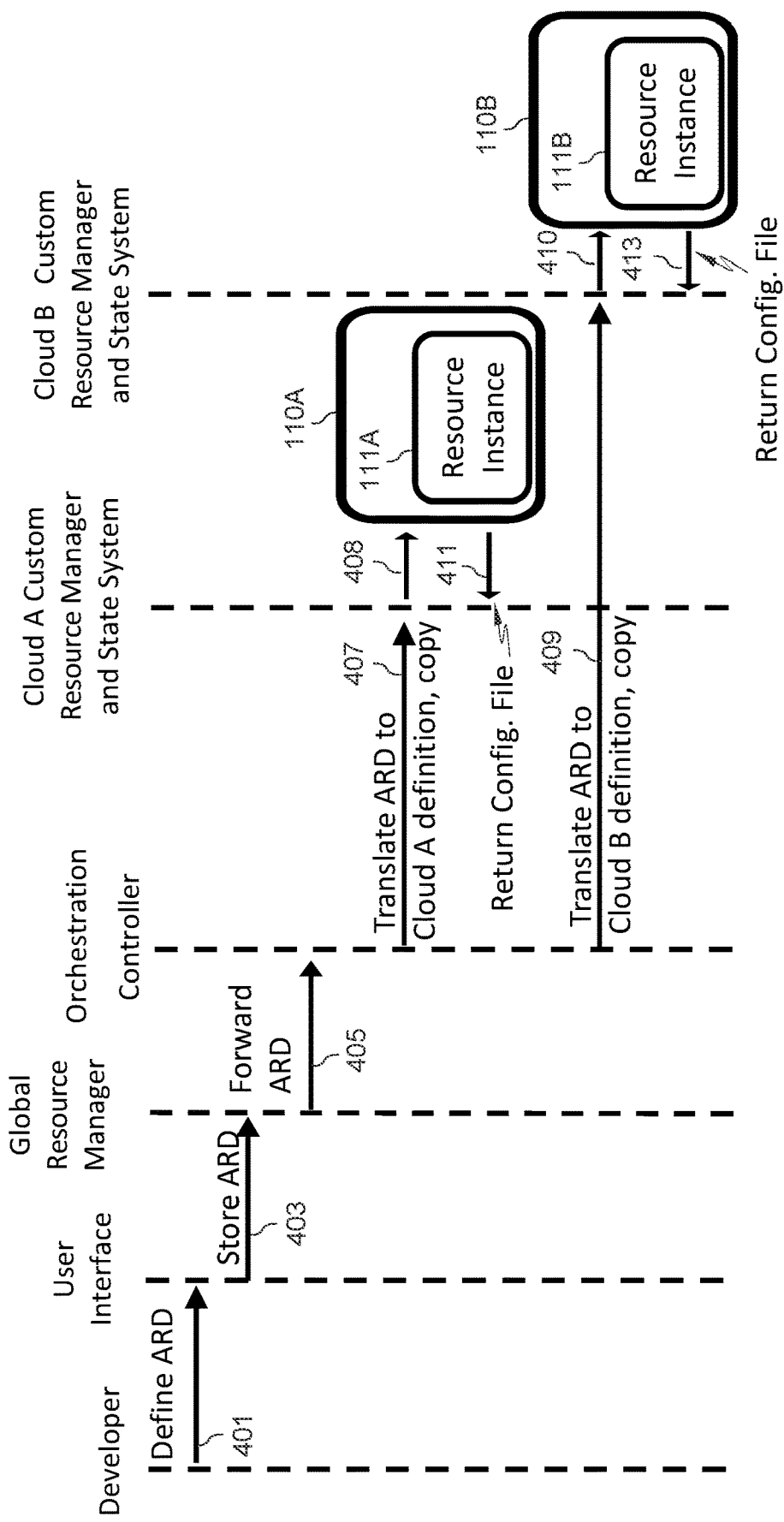
FIG. 4 schematically depicts an illustrative data flow diagram for deployment of cloud resources in one or more cloud environments, according to one or more embodiments shown and described herein.

Example Data Flow Diagram for Deploying Cloud Resources on Different Cloud Environments FIG. 4 schematically depicts an illustrative data flow diagram for deployment of cloud resources in one or more cloud environments.

In some embodiments, the developer defines the abstract resource definition 101 through the user interface as depicted by data flow arrow 401. While in some embodiments, the abstract resource definition 101 may be defined in response to a developer indicating that an existing instance of a cloud resource is to be deployed at additional location within one or more different cloud environments 110A, 110B, and 110C. In such an instance the abstract resource definition 101 may be generated by scanning the deployed instance of the cloud resource at a deployment location which is different from the target deployment location, thereby obtaining the configuration parameters for the cloud resource.

In the depicted example, the abstract resource definition 101 is stored in a storage device (e.g., memory 610 of FIG. 6) in response to being defined through the user interface and provided to the global resource manager 215, as depicted by data flow arrow 403 and as previously described in FIG. 3. The global resource manager 215 forwards the abstract resource definition 101 to the orchestration controller 203, as depicted by data flow arrow 405 and as previously described in FIG. 3. The orchestration controller 203, as previously described, identifies the custom resource managers (e.g., 205A and 205B of FIG. 3) that should receive a copy of the abstract resource definition 101 based on the target deployment locations. The orchestration controller 203 routes a copy of the abstract resource definition 101 to the appropriate custom resource managers 205A and 205B as depicted by data flow arrows 407 and 409, respectively. The custom resource managers 205A and 205B utilize their customized translation process to translate the abstract resource definition 101 into respective manifests capable of deploying an instance 111A and 111B of the cloud resource on the respective cloud environments 110A and 110B and further deploying the instances 111A and 111B as depicted by data flow arrows 408 and 410, respectively. In response to deploying the instances 111A and 111B of the cloud resource on the respective cloud environments 110A and 110B, the respective cloud environments 110A and 110B return a configuration file providing information such as name, address, and/or other deployed configuration parameters to the state system corresponding to the custom resource managers 205A and 205B as depicted by data flow arrows 411 and 413, respectively.

Example Method for Deploying Cloud Resources

FIG. 5 depicts an example method for deploying cloud resources in one or more cloud environments.

In this example, method 500 begins at step 505 with receiving a request, through a user interface, to deploy a cloud resource. The request includes an abstract resource definition and one or more target deployment locations. In some embodiments, the one or more target deployment locations may be directed specified by the developer. In other instances, the developer may simply not provide the one or more target deployment locations. In such a case, a wildcard or default value is applied. The wildcard has the function to select all available regions and cloud environments that are currently supported by resource managers. Moreover, as new regions and/or cloud environments become available, the state system 217 may automatically cause an update routine where the method 500 is executed to deploy instances of the cloud resources on the new regions and/or cloud environments. The default value may be a value predefined by a developer. That is, the system described herein may store a default list of target deployment locations for a developer and thus use this list in the event the developer indicates the default value for the target deployment locations. For example, step 505 may be performed by the user interface 201 and is optionally implemented by the processing system 600 as described below with reference to FIG. 6.

Method 500 then proceeds to step 510 with identifying and executing a first resource manager associated with a first target deployment location of the one or more target deployment locations. It is should be understood that the process of step 510 may be executed a number of times, for example, for each of the one or more target deployment locations indicated in the request. For example, step 510 may be performed by the orchestration controller 203 and is optionally implemented by the processing system 600 as described below with reference to FIG. 6.

Method 500 then proceeds to step 515 with generating, with the first resource manager based on the abstract resource definition, a first manifest for deployment of the cloud resource at the first target deployment location. It is should be understood that the process of step 515 may be executed a number of times, for example, for each of the one or more target deployment locations indicated in the request. For example, step 515 may be performed by the one or more of the resource managers 205 (e.g., 205A, 205B, 205C of FIG. 2) and is optionally implemented by the processing system 600 as described below with reference to FIG. 6.

Method 500 then proceeds to step 520 with deploying, with the first resource manager, an instance of the cloud resource on a first cloud-computing infrastructure defined by the first target deployment location. The instance is based on the first manifest. It is should be understood that the process of step 520 may be executed a number of times, for example, for each of the one or more target deployment locations indicated in the request. For example, step 520 may be performed by the one or more of the resource managers 205 (e.g., 205A, 205B, 205C) and is optionally implemented by the processing system 600 as described below with reference to FIG. 6.

Method 500 then proceeds to step 525 with returning, through the user interface, information corresponding to the instance of the cloud resource deployed on the first cloud-computing infrastructure. It is should be understood that the process of step 525 may be executed a number of times, for example, for each of the one or more target deployment locations indicated in the request. For example, step 525 may be performed by the user interface 201 and is optionally implemented by the processing system 600 as described below with reference to FIG. 6.

In some embodiments, method 500 further proceeds to step 530 with establishing a first state system API. The first state system API configured to monitor the instance of the cloud resource deployed on the first cloud-computing infrastructure and the first manifest. It is should be understood that the process of step 530 may be executed a number of times, for example, for each of the one or more target deployment locations indicated in the request. For example, step 530 may be performed by the one or more of the state systems 207 (e.g., 207A, 207B, 207C) and 217 and is optionally implemented by the processing system 600 as described below with reference to FIG. 6.

In some embodiments, method 500 further proceeds to step 535 with determining, with the first state system API, a difference between the instance of the cloud resource deployed on the first cloud-computing infrastructure and the first manifest. It is should be understood that the process of step 535 may be executed a number of times, for example, for each of the one or more target deployment locations indicated in the request. For example, step 535 may be performed by the one or more of the state systems 207 (e.g., 207A, 207B, 207C) and 217 and is optionally implemented by the processing system 600 as described below with reference to FIG. 6.

In some embodiments, method 500 further proceeds to step 540 with reconciling the difference by updating the instance of the cloud resource deployed on the first cloud-computing infrastructure. It is should be understood that the process of step 540 may be executed a number of times, for example, for each of the one or more target deployment locations indicated in the request. For example, step 540 may be performed by the one or more of the state systems 207 (e.g., 207A, 207B, 207C) and 217 and is optionally implemented by the processing system 600 as described below with reference to FIG. 6.

In embodiments where the request indicates a wildcard or a plurality of target deployment locations in the request, the method 500 is configured to execute iterations for each of the identified target deployment locations.

Note that FIG. 5 is just one example of a method, and other methods including fewer, additional, or alternative steps are possible consistent with this disclosure.

As described herein, embodiments include systems and methods for deploying cloud resources across a plurality of different cloud environments based on an abstract resource definition that is cloud agnostic. For example, embodiments include a method for deployment of cloud resources in one or more cloud environments. The method includes receiving a request, through a user interface, to deploy a cloud resource, the request comprising an abstract resource definition and one or more target deployment locations and identifying and executing a first resource manager associated with a first target deployment location of the one or more target deployment locations. The method further includes generating, with the first resource manager based on the abstract resource definition, a first manifest for deployment of the cloud resource at the first target deployment location and deploying, with the first resource manager, an instance of the cloud resource on a first cloud-computing infrastructure defined by the first target deployment location, wherein the instance is based on the first manifest. Once the cloud resource is deployed, the method proceeds with returning, through the user interface, information corresponding to the instance of the cloud resource deployed on the first cloud-computing infrastructure.

Figure 6:
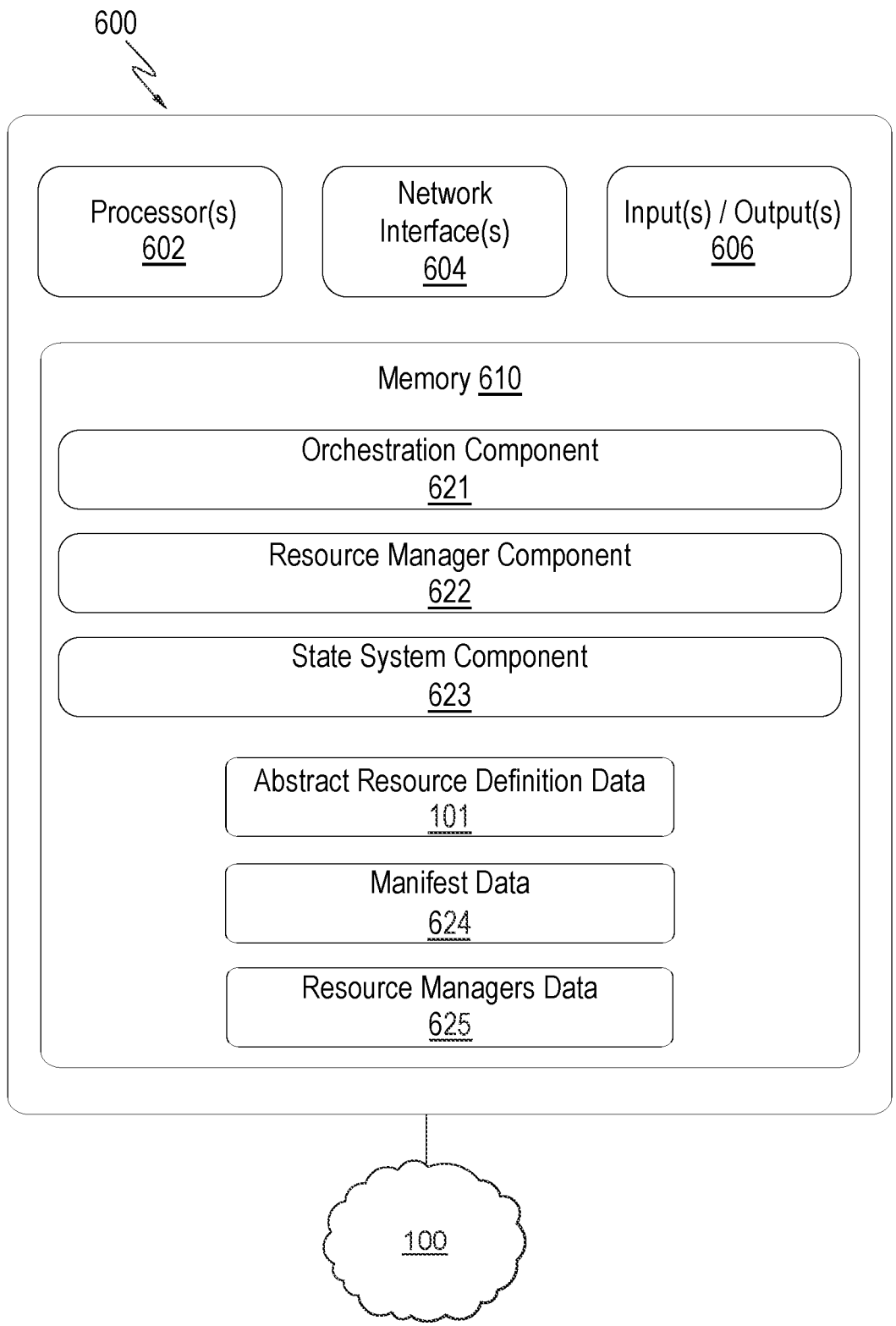
FIG. 6 schematically depicts an illustrative computing network and computing device for deploying cloud resources in one or more cloud environments, according to one or more embodiments shown and described herein.

Example Processing System for Deploying Cloud Resources on Different Cloud Environments FIG. 6 depicts an example processing system 600 configured to perform the methods described herein. The processing system 600 may be a computing device, a server, or a cloud service. The processing system 600 is communicatively coupled to the cloud-computing network 100.

Processing system 600 includes one or more processors 602. Generally, processor(s) 602 may be configured to execute computer-executable instructions (e.g., software code) to perform various functions, as described herein.

Processing system 600 further includes a network interface(s) 604, which generally provides data access to any sort of data network, including personal area networks (PANs), local area networks (LANs), wide area networks (WANs), the Internet, and the like.

Processing system 600 further includes input(s) and output(s) 606, which generally provide means for providing data to and from processing system 600, such as via connection to computing device peripherals, including user interface peripherals. For example, the input(s) and output(s) may include a monitor, keyboard, mouse, printer, camera, microphone, speaker, and/or other device for receiving, sending, and/or presenting data.

Processing system 600 further includes a memory 610 configured to store various types of components and data. The memory 610 may be machine-readable memory, which may also be referred to as a non-transitory processor readable memory. The memory 610 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components.

In this example, memory 610 includes orchestration component 621, resource manager component 622, and state system component 623.

Orchestration component 621 refers to orchestration logic. The orchestration logic includes a set of instructions that when executed perform the operations of the orchestration controller 203 described herein with reference to FIGS. 1-5.

Resource manager component 622 refers to resource manager logic. The resource manager logic includes one or more sets of instructions that when executed perform the operations of the resource managers 205A, 205B, 205C, and 215 described herein with reference to FIGS. 1-5.

State system component 623 refers to state system logic. The state system logic includes a set of instructions that when executed perform the operations of the state systems 207A, 207B, 207C, and 217 described herein with reference to FIGS. 1-5.

In this example, memory 610 also includes abstract resource definition data 101, manifest data 624, and resource managers' data 625. Abstract resource definition data 101 refers to abstract resource definitions as described herein with reference to FIGS. 1-5. Manifest data 624 refers to manifests as described herein with reference to FIGS. 1-5. Resource managers' data 625 refers to a plurality of resources managers as described herein with reference to FIGS. 1-5.

Processing system 600 may be implemented in various ways. For example, processing system 600 may be implemented within on-site, remote, or cloud-based processing equipment.

Processing system 600 is just one example, and other configurations are possible. For example, in alternative embodiments, aspects described with respect to processing system 600 may be omitted, added, or substituted for alternative aspects.

Example Clauses

Implementation examples are described in the following numbered clauses:

Clause 1: A method for deployment of cloud resources in one or more cloud environments, comprising: receiving a request, through a user interface, to deploy a cloud resource, the request comprising an abstract resource definition and one or more target deployment locations; identifying and executing a first resource manager associated with a first target deployment location of the one or more target deployment locations; generating, with the first resource manager based on the abstract resource definition, a first manifest for deployment of the cloud resource at the first target deployment location; deploying, with the first resource manager, an instance of the cloud resource on a first cloud-computing infrastructure defined by the first target deployment location, wherein the instance is based on the first manifest; and returning, through the user interface, information corresponding to the instance of the cloud resource deployed on the first cloud-computing infrastructure.

Clause 2: The method of Clause 1, further comprising establishing a first state system API, the first state system API configured to monitor the instance of the cloud resource deployed on the first cloud-computing infrastructure and the first manifest.

Clause 3: The method of Clause 2, further comprising determining, with the first state system API, a difference between the instance of the cloud resource deployed on the first cloud-computing infrastructure and the first manifest; and reconciling the difference by updating the instance of the cloud resource deployed on the first cloud-computing infrastructure.

Clause 4: The method of any one of Clauses 1-3, wherein the first resource manager is further configured to parse the abstract resource definition into at least one of a set of network rules and application programming interface calls for deploying the cloud resource at the first target deployment location.

Clause 5: The method of any one of Clauses 1-4, where the one or more target deployment locations include the first target deployment location and a second target deployment location defining a second cloud-computing infrastructure that is different from the first cloud-computing infrastructure, and the method further comprises: identifying and executing a second resource manager associated with the second target deployment location, wherein: generating, with the second resource manager, a second manifest from the abstract resource definition for deployment of a second cloud resource at the second target deployment location; deploying, with the second resource manager, an instance of the second cloud resource on the second cloud-computing infrastructure defined by the second target deployment location, wherein the instance is based on the second manifest; and returning, through the user interface, information corresponding to the instance of the second cloud resource deployed on the second cloud-computing infrastructure.

Clause 6: The method of any one of Clauses 1-5, wherein the one or more target deployment locations defined in the request comprise a wildcard indicating deployment of the cloud resource at a predetermined set of deployment locations.

Clause 7: The method of Clause 6, determining an additional deployment location to the predetermined set of deployment locations, and in response to determining the addition of a deployment location: identifying and executing a tertiary resource manager associated with the additional deployment location; generating, with the tertiary resource manager, a tertiary manifest from the abstract resource definition for deployment of the cloud resource at the additional deployment location; deploying, with the tertiary resource manager, an instance of the cloud resource on a tertiary cloud-computing infrastructure defined by the additional deployment location, wherein the instance is based on the tertiary manifest; and returning, through the user interface, information corresponding to the instance of the cloud resource deployed on the tertiary cloud-computing infrastructure.

Clause 8: The method of any one of Clauses 1-7, wherein the abstract resource definition is a definition of the cloud resource defined in a cloud agnostic form.

Clause 9: The method of any one of Clauses 1-8, wherein the abstract resource definition provided in the request is generated by scanning a currently deployed instance of the cloud resource at a deployment location different from the one or more target deployment locations.

Clause 10: A system for deployment of cloud resources in one or more cloud environments, comprising: a computing device communicatively coupled to a cloud-computing network, the computing device configured to: receive a request, with the computing device, to deploy a cloud resource, the request comprising an abstract resource definition and one or more target deployment locations; identify and execute a first resource manager associated with a first target deployment location of the one or more target deployment locations; generate, with the first resource manager based on the abstract resource definition, a first manifest for deployment of the cloud resource at the first target deployment location; deploy, with the first resource manager, an instance of the cloud resource on a first cloud-computing infrastructure defined by the first target deployment location, wherein the instance is based on the first manifest; and return, through a user interface of the computing device, information corresponding to the instance of the cloud resource deployed on the first cloud-computing infrastructure.

Clause 11: The system of Clause 10, wherein the computing device is further configured to establish a first state system API, the first state system API configured to monitor the instance of the cloud resource deployed on the first cloud-computing infrastructure and the first manifest.

Clause 12: The system of claim 11, wherein the computing device is further configured to: determine, with the first state system API, a difference between the instance of the cloud resource deployed on the first cloud-computing infrastructure and the first manifest; and reconcile the difference by updating the instance of the cloud resource deployed on the first cloud-computing infrastructure.

Clause 13: The system of any one of Clauses 10-12, wherein the first resource manager is further configured to parse the abstract resource definition into at least one of a set of network rules and application programming interface calls for deploying the cloud resource at the first target deployment location.

Clause 14: The system of any one of Clauses 10-13, wherein the one or more target deployment locations include the first target deployment location and a second target deployment location defining a second cloud-computing infrastructure that is different from the first cloud-computing infrastructure, and the computing device is further configured to: identify and execute a second resource manager associated with the second target deployment location, wherein: generate, with the second resource manager, a second manifest from the abstract resource definition for deployment of a second cloud resource at the second target deployment location; deploy, with the second resource manager, an instance of the second cloud resource on the second cloud-computing infrastructure defined by the second target deployment location, wherein the instance is based on the second manifest; and return, through the user interface, information corresponding to the instance of the second cloud resource deployed on the second cloud-computing infrastructure.

Clause 15: The system of any one of Clauses 10-14, wherein the one or more target deployment locations defined in the request comprise a wildcard indicating deployment of the cloud resource at a predetermined set of deployment locations.

Clause 16: The system of Clause 16, wherein the computing device is further configured to: determine an additional deployment location to the predetermined set of deployment locations, and in response to determining the addition of a deployment location: identify and executing a tertiary resource manager associated with the additional deployment location; generate, with the tertiary resource manager, a tertiary manifest from the abstract resource definition for deployment of the cloud resource at the additional deployment location; deploy, with the tertiary resource manager, an instance of the cloud resource on a tertiary cloud-computing infrastructure defined by the additional deployment location, wherein the instance is based on the tertiary manifest; and return, through the user interface, information corresponding to the instance of the cloud resource deployed on the tertiary cloud-computing infrastructure.

Clause 17: The system of any one of Clauses 10-16, wherein the abstract resource definition is a definition of the cloud resource defined in a cloud agnostic form.

Clause 18: The system of any one of Clauses 10-17, wherein the abstract resource definition provided in the request is generated by scanning a currently deployed instance of the cloud resource at a deployment location different from the one or more target deployment locations.

Clause 19: A computer program product for deployment of cloud resources in one or more cloud environments, the computer program product comprising instructions, which when executed by a computer, cause the computer to carry out steps comprising: receiving a request, through a user interface, to deploy a cloud resource, the request comprising an abstract resource definition and one or more target deployment locations; identifying and executing a first resource manager associated with a first target deployment location of the one or more target deployment locations; generating, with the first resource manager based on the abstract resource definition, a first manifest for deployment of the cloud resource at the first target deployment location; deploying, with the first resource manager, an instance of the cloud resource on a first cloud-computing infrastructure defined by the first target deployment location, wherein the instance is based on the first manifest; and returning, through the user interface, information corresponding to the instance of the cloud resource deployed on the first cloud-computing infrastructure.

Clause 20: The computer program product of Clause 19, wherein the abstract resource definition is a definition of the cloud resource defined in a cloud agnostic form.

Clause 21: A processing system, comprising: a memory comprising computer-executable instructions; and a processor configured to execute the computer-executable instructions and cause the processing system to perform a method in accordance with any one of Clauses 1-9.

Clause 22: A processing system, comprising means for performing a method in accordance with any one of Clauses 1-9.

Clause 23: A non-transitory computer-readable medium comprising computer-executable instructions that, when executed by a processor of a processing system, cause the processing system to perform a method in accordance with any one of Clauses 1-9.

Clause 24: A computer program product embodied on a computer-readable storage medium comprising code for performing a method in accordance with any one of Clauses 1-9.

Additional Considerations

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. A method for deployment of cloud resources in one or more cloud environments, comprising:
   receiving a request, through a user interface, to deploy a cloud resource, the request comprising an abstract resource definition and one or more target deployment locations;
   identifying and executing a first resource manager associated with a first target deployment location of the one or more target deployment locations;
   generating, with the first resource manager based on the abstract resource definition, a first manifest for deployment of the cloud resource at the first target deployment location;
   deploying, with the first resource manager, an instance of the cloud resource on a first cloud-computing infrastructure defined by the first target deployment location, wherein the instance is based on the first manifest; and
   returning, through the user interface, information corresponding to the instance of the cloud resource deployed on the first cloud-computing infrastructure.

2. The method of claim 1, further comprising establishing a first state system API, the first state system API configured to monitor the instance of the cloud resource deployed on the first cloud-computing infrastructure and the first manifest.

3. The method of claim 2, further comprising:
   determining, with the first state system API, a difference between the instance of the cloud resource deployed on the first cloud-computing infrastructure and the first manifest; and
   reconciling the difference by updating the instance of the cloud resource deployed on the first cloud-computing infrastructure.

4. The method of claim 1, wherein the first resource manager is further configured to parse the abstract resource definition into at least one of a set of network rules and application programming interface calls for deploying the cloud resource at the first target deployment location.

5. The method of claim 1, wherein:
   the one or more target deployment locations include the first target deployment location and a second target deployment location defining a second cloud-computing infrastructure that is different from the first cloud-computing infrastructure, and
   the method further comprises:
      identifying and executing a second resource manager associated with the second target deployment location, wherein:
      generating, with the second resource manager, a second manifest from the abstract resource definition for deployment of a second cloud resource at the second target deployment location;
      deploying, with the second resource manager, an instance of the second cloud resource on the second cloud-computing infrastructure defined by the second target deployment location, wherein the instance is based on the second manifest; and returning, through the user interface, information corresponding to the instance of the second cloud resource deployed on the second cloud-computing infrastructure.

6. The method of claim 1, wherein the one or more target deployment locations defined in the request comprise a wildcard indicating deployment of the cloud resource at a predetermined set of deployment locations.

7. The method of claim 6, further comprising:
determining an additional deployment location to the predetermined set of deployment locations, and
in response to determining the addition of a deployment location:
identifying and executing a tertiary resource manager associated with the additional deployment location;
generating, with the tertiary resource manager, a tertiary manifest from the abstract resource definition for deployment of the cloud resource at the additional deployment location;
deploying, with the tertiary resource manager, an instance of the cloud resource on a tertiary cloud-computing infrastructure defined by the additional deployment location, wherein the instance is based on the tertiary manifest; and
returning, through the user interface, information corresponding to the instance of the cloud resource deployed on the tertiary cloud-computing infrastructure.

8. The method of claim 1, wherein the abstract resource definition is a definition of the cloud resource defined in a cloud agnostic form.

9. The method of claim 1, wherein the abstract resource definition provided in the request is generated by scanning a currently deployed instance of the cloud resource at a deployment location different from the one or more target deployment locations.

10. A system for deployment of cloud resources in one or more cloud environments, comprising:
a computing device communicatively coupled to a cloud-computing network, the computing device configured to:
receive a request, with the computing device, to deploy a cloud resource, the request comprising an abstract resource definition and one or more target deployment locations;
identify and execute a first resource manager associated with a first target deployment location of the one or more target deployment locations;
generate, with the first resource manager based on the abstract resource definition, a first manifest for deployment of the cloud resource at the first target deployment location;
deploy, with the first resource manager, an instance of the cloud resource on a first cloud-computing infrastructure defined by the first target deployment location, wherein the instance is based on the first manifest; and
return, through a user interface of the computing device, information corresponding to the instance of the cloud resource deployed on the first cloud-computing infrastructure.

11. The system of claim 10, wherein the computing device is further configured to establish a first state system API, the first state system API configured to monitor the instance of the cloud resource deployed on the first cloud-computing infrastructure and the first manifest.

12. The system of claim 11, wherein the computing device is further configured to:
determine, with the first state system API, a difference between the instance of the cloud resource deployed on the first cloud-computing infrastructure and the first manifest; and
reconcile the difference by updating the instance of the cloud resource deployed on the first cloud-computing infrastructure.

13. The system of claim 10, wherein the first resource manager is further configured to parse the abstract resource definition into at least one of a set of network rules and application programming interface calls for deploying the cloud resource at the first target deployment location.

14. The system of claim 10, wherein:
the one or more target deployment locations include the first target deployment location and a second target deployment location defining a second cloud-computing infrastructure that is different from the first cloud-computing infrastructure, and
the computing device is further configured to:
identify and execute a second resource manager associated with the second target deployment location, wherein:
generate, with the second resource manager, a second manifest from the abstract resource definition for deployment of a second cloud resource at the second target deployment location;
deploy, with the second resource manager, an instance of the second cloud resource on the second cloud-computing infrastructure defined by the second target deployment location, wherein the instance is based on the second manifest; and
return, through the user interface, information corresponding to the instance of the second cloud resource deployed on the second cloud-computing infrastructure.

15. The system of claim 10, wherein the one or more target deployment locations defined in the request comprise a wildcard indicating deployment of the cloud resource at a predetermined set of deployment locations.

16. The system of claim 15, wherein the computing device is further configured to:
determine an additional deployment location to the predetermined set of deployment locations, and
in response to determining the addition of a deployment location:
identify and executing a tertiary resource manager associated with the additional deployment location;
generate, with the tertiary resource manager, a tertiary manifest from the abstract resource definition for deployment of the cloud resource at the additional deployment location;
deploy, with the tertiary resource manager, an instance of the cloud resource on a tertiary cloud-computing infrastructure defined by the additional deployment location, wherein the instance is based on the tertiary manifest; and
return, through the user interface, information corresponding to the instance of the cloud resource deployed on the tertiary cloud-computing infrastructure.

17. The system of claim 10, wherein the abstract resource definition is a definition of the cloud resource defined in a cloud agnostic form.

18. The system of claim 10, wherein the abstract resource definition provided in the request is generated by scanning a currently deployed instance of the cloud resource at a deployment location different from the one or more target deployment locations.

19. A computer program product for deployment of cloud resources in one or more cloud environments, the computer program product comprising instructions, which when executed by a computer, cause the computer to carry out steps comprising:

receiving a request, through a user interface, to deploy a cloud resource, the request comprising an abstract resource definition and one or more target deployment locations;

identifying and executing a first resource manager associated with a first target deployment location of the one or more target deployment locations;

generating, with the first resource manager based on the abstract resource definition, a first manifest for deployment of the cloud resource at the first target deployment location;

deploying, with the first resource manager, an instance of the cloud resource on a first cloud-computing infrastructure defined by the first target deployment location, wherein the instance is based on the first manifest; and returning, through the user interface, information corresponding to the instance of the cloud resource deployed on the first cloud-computing infrastructure.

20. The computer program product of claim 19, wherein the abstract resource definition is a definition of the cloud resource defined in a cloud agnostic form.

* * * * *